May 16, 1961 I. W. COX 2,984,770

ELECTROMAGNETIC DEVICES

Filed April 22, 1957 3 Sheets-Sheet 1

Inventor
Irvin W. Cox
By H. R. Rather
Attorney

Inventor
Irvin W. Cox
By H R Rather
Attorney

May 16, 1961 I. W. COX 2,984,770
ELECTROMAGNETIC DEVICES
Filed April 22, 1957
3 Sheets-Sheet 3
Fig. 9
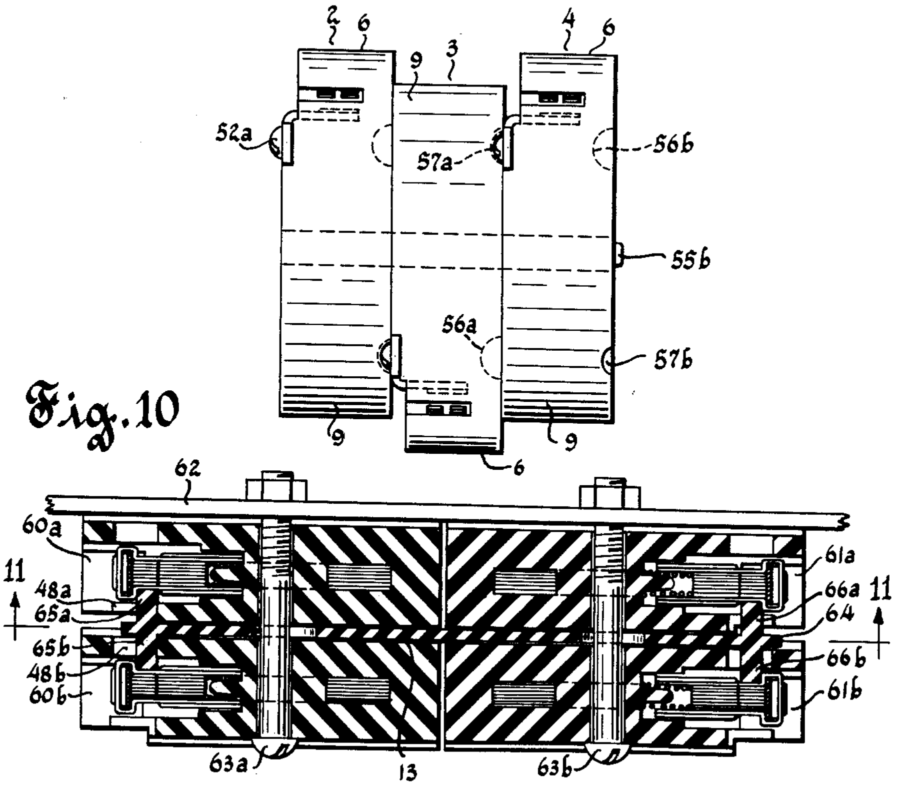
Fig. 9, Fig. 10
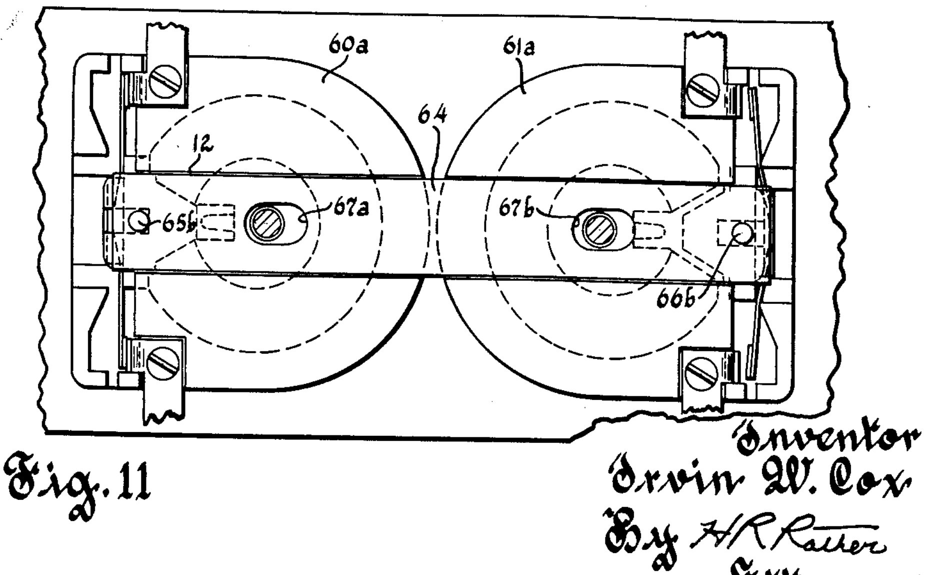
Fig. 11
Inventor
Irvin W. Cox
By H R Ratter
Attorney 2,984,770

ELECTROMAGNETIC DEVICES

Irvin W. Cox, West Allis, Wis., assignor to Cutler-Hammer, Inc., Milwaukee, Wis., a corporation of Delaware Filed Apr. 22, 1957, Ser. No. 654,308
16 Claims. (Cl. 317—157)

This invention relates to electromagnetic devices and more particularly to alternating current contactors and relays.

While not limited thereto, the invention is especially applicable to alternating current contactors and relays employed in electrical control systems where good quality of performance and low noise are required.

An object of the invention is to provide improved electromagnetic devices.

A more specific object of the invention is to provide improved alternating current contactors having a minimum number of parts and capable of being stacked in forward and reverse abutting relation.

A still more specific object of the invention is to provide improved means for commutating a given amount of electrical energy at a significantly reduced energy level.

A further specific object of the invention is to provide improved means for dividing a commutation power pulse into a plurality of low energy pulses selectively distributed in time and space.

Another object of the invention is to provide improved means for mechanically interlocking groups of contactors to prevent simultaneous operation of the latter.

A further object of the invention is to provide improved circuit means for energizing a plurality of contactors in any desired permutation or combination.

Other objects and advantages of the invention will hereinafter appear.

While the invention hereinafter described is effectively adapted to fulfill the objects stated, it is to be understood that I do not intend to confine my invention to the particular preferred embodiment of electromagnetic device disclosed, inasmuch as it is susceptible of various modifications without departing from the scope of the appended claims.

Figures 1, 2, 3:
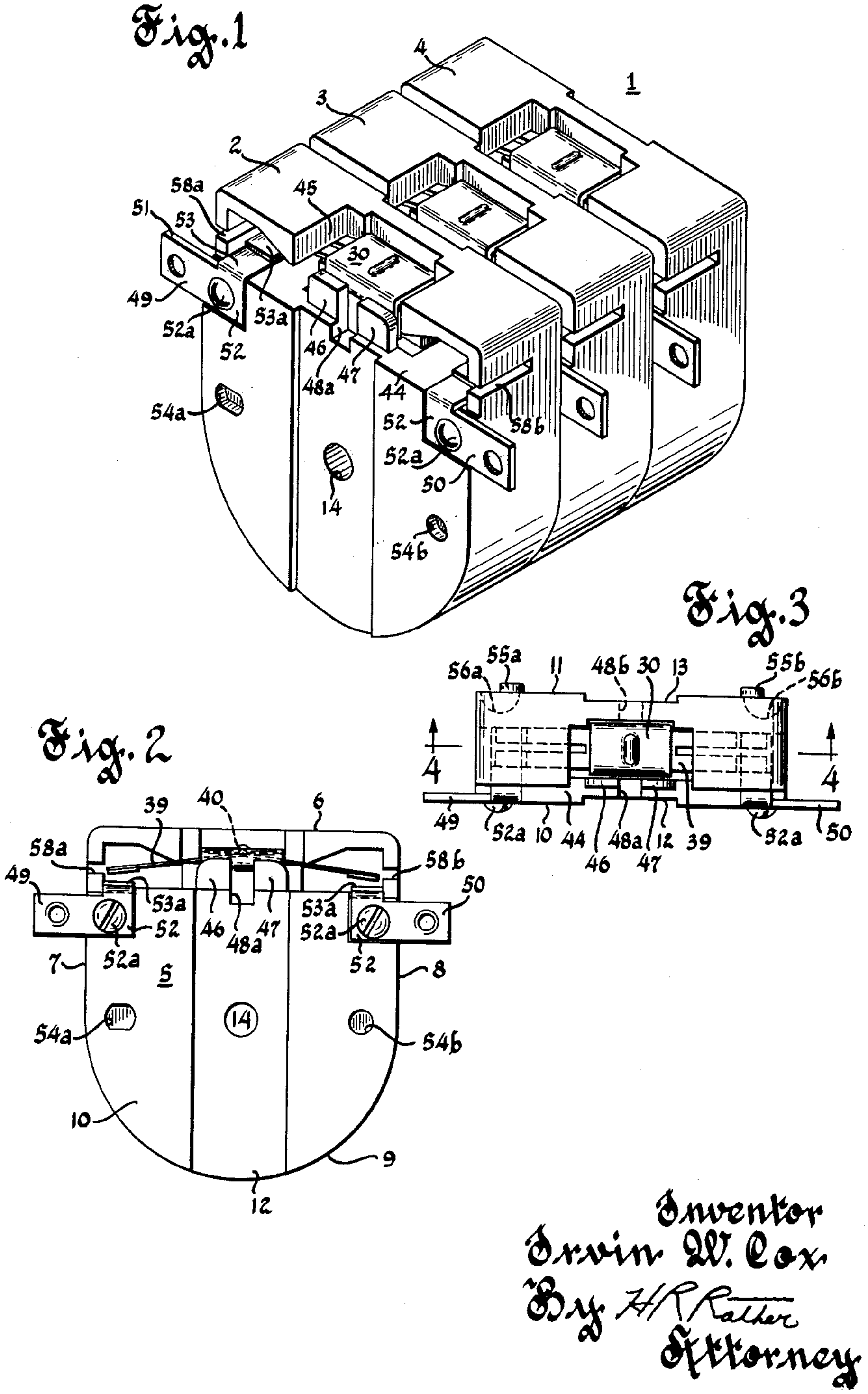
Figure 1 is a view in perspective of a plurality of stacked contactor units.
Fig. 2 is a front view of one of the contactor units of Fig. 1.
Fig. 3 is a top view of the contactor unit of Fig. 2.
Figure 8:
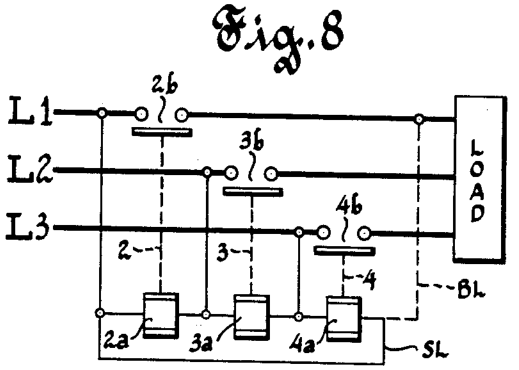
Figure 8A:
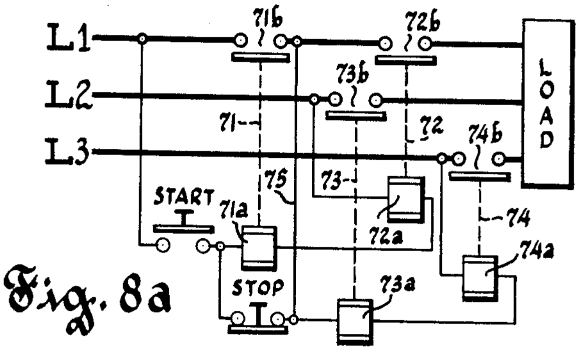

Fig. 8 schematically depicts an operating circuit for the stacked contactor units of Fig. 1;

Fig. 8*a* schematically depicts a modified operating circuit for such stacked contactor units;

Fig. 9 shows a side view of a modified stack of the contactor units;

Fig. 10 is a sectional view of a plurality of stacks of contactor units mechanically interlocked; and Fig. 11 is a front view of a plurality of mechanically interlocked contactor units taken along the line 11—11 of Fig. 10.

Figure 6:
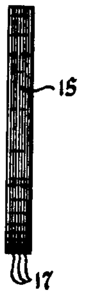
Fig. 6 is a side view of the core portion of the contactor unit of Fig. 4.

Referring to Fig. 1 an electromagnetic contactor stack is indicated generally at 1 comprising three identical individually operable contactor units 2, 3 and 4. The abutting faces of the contactor units have interfitting complementary engaging portions more fully hereinafter described for alining the units relative to one another and frictional engagement thereof in reverse positions. As more clearly shown in Figs. 2, 3 and 4, each contactor unit comprises a unitary molded base 5 of thermosetting insulating material or the like having a substantially straight top portion 6 and straight side portions 7 and 8 terminating in a substantially semi-circular bottom portion 9. Centrally of the front and back faces 10 and 11 of base 5 are shallow vertical grooves 12 and 13, respectively, for slidably accommodating mechanical interlocking members hereinafter described. A hole 14 for a clamping bolt is provided at substantially the mid-portion of base 5 and extending through the latter from groove 12 to groove 13. A substantially circular core 15 shown in Fig. 4 and an energizing coil 16 wound thereon are embedded in base 5. Core 15 is formed of a plurality of thin flat laminations 17 of magnetic material shown in Fig. 6 to reduce eddy current losses caused by the alternating magnetic flux. Circular core 15 is broken at its upper portion to provide a pair of oppositely disposed, outwardly diverging pole faces 18 and 19 extending into an armature cavity 20 in the upper portion of base 5, the latter also having contact cavities 21 and 22 extending in opposite directions from armature cavity 20. Holes 23 and 24 are provided on opposite sides of base 5 for accommodating electrical conductors or connectors for connecting coil 16 to an external circuit.

A substantially T-shaped armature 25 is positioned in cavity 20 for cooperation with and normally biased away from pole faces 18 and 19 of core 15. Armature 25 comprises a plurality of substantially T-shaped thin flat laminations 26 of magnetic material shown in Fig. 7, forming a magnetic member having a horizontal cross portion 27 and integral with the latter a leg portion **27*a* having downwardly converging sides 28 and 29 in juxtaposition with the complementary upwardly diverging pole faces of core 15. Surrounding armature 25 is a shading coil 30 comprised of a single turn of electrically conductive material such as copper or the like for maintaining the absolute value of the magnetic fluxes above zero value at all times throughout the cyclic variations of the alternating current. Shading coil 30 extends over armature 25 and is provided with free ends 31 and 32 extending downwardly beyond the leg of the armature, the free ends being provided with inwardly opening, longitudinal concavities 33 and 34, respectively, forming a receptacle for a bias spring 35. An upstanding molded projection 36 is provided in the bottom of the armature cavity for retaining spring 35 in place. Armature 25 is provided with a pair of holes 37 extending therethrough in alinement with corresponding holes in shading coil 30** for accommodating rivets, solder or the like to close the shading coil loop and to rigidly secure the armature laminations between opposed portions of the shading coil in a unitary structure.

Figure 4:
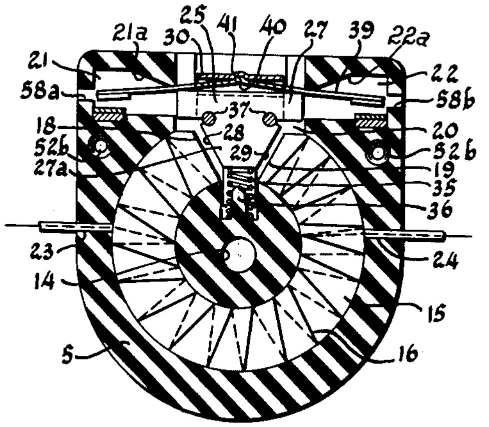
Fig. 4 is a sectional view taken along lines 4—4 of Fig. 3.
Figure 7:
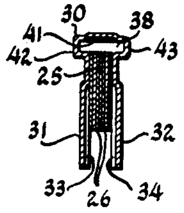
Fig. 7 is a sectional view of the armature portion of the contactor unit of Fig. 4.

An opening 38 shown in Fig. 7 is provided between the upper portion of the armature laminations and the shading coil for receiving a double-ended bifurcated movable contact 39. Contact 39 is provided with well known contact tips at its bifurcated ends for cooperation with stationary contacts hereinafter described. The ends of contact 39 are bent downwardly at a small angle at its midporition and the upper surface of the latter is provided with a transverse bead 40 or the like for locking engagement with a complementary groove 41 in shading coil 25 interiorly of opening 38 for retaining contact 39 and the armture in assembled relation. As best illustrated in Fig. 4, the upper surface of the contact 39 normally engages the upper interior walls 21*a* and 22*a* of contactor cavities 21 and 22, respectively, to maintain armature 25 in properly assembled relationship within the armature cavity 20. Shading coil 30 has oppositely extending lateral portions 42 and 43 as shown in Fig. 7 defining opening 38 and providing outwardly extending flanges for abutting engagement with interlocking members hereinafter described.

The upper front face of base 5 has an opening 44 thereacross shown in Fig. 1 exposing the contact cavities and the armature cavity and extending into an opening 45 in the upper portion of the base overlying the armature cavity, the latter opening permitting insertion of the armature into its cavity. Lateral movement of the armature is restricted by a pair of guide members 46 and 47 integrally formed with and upwardly extending from the front face of base 5 adjacent the armature cavity. A vertical slot 48*a* is provided between guide members 46 and 47 in alinement with a vertical opening 48*b* in the rear face of base 5 for receiving the aforementioned interlocking members. A continuous groove is provided extending along the bottom of each contact cavity to the front face of base 5 and in opposite directions along the latter for receiving stationary contact members 49 and 50, respectively.

Each stationary contact member such as 49 comprises a substantially L-shaped strip of electrically conductive material having a perforated terminal portion 51, a perforated mid-portion 52 and a contact portion 53 bent at a right angle to the terminal portion to project into the contact cavity. Each contact portion has electrically connected thereto a well known contact tip 53*a* of precious metal or the like having good electrical conductivity. The stationary contact members are secured to base 5 by screws 52*a* in threaded engagement with internally threaded bushings 52*b* rigidly molded into base 5 as shown in Fig. 4. Slots 58*a* and 58*b* opening into the respective contact cavities are provided to facilitate insertion of the movable contact 39 from either side of the base and locking the latter in groove 41 of the shading coil.

Molded base 5 additionally is provided with suitably spaced depressions 54*a* and 54*b* on the front face thereof respectively in alinement with complementary projections 55*a* and 55*b* on the back face thereof. The aforementioned projections are provided for interlocking frictional engagement with corresponding depressions on an abutting contactor unit base for retaining the contactor units in forward stacked relation as shown in Fig. 1 or in reverse stacked relation as shown in Fig. 9 while a suitable clamping bolt is assembled through holes 14. Base 5 is also provided with a pair of spaced cutout portions 56*a* and 56*b*, shown in Fig. 3, near the upper portion of the back face thereof for accommodating the projecting heads of screws 52*a* of an abutting contactor unit in forward stacked relation and another pair of cutout portions 57*a* and 57*b* shown in Fig. 9 for accommodating such screw heads in reverse stacked relation.

Figure 5:
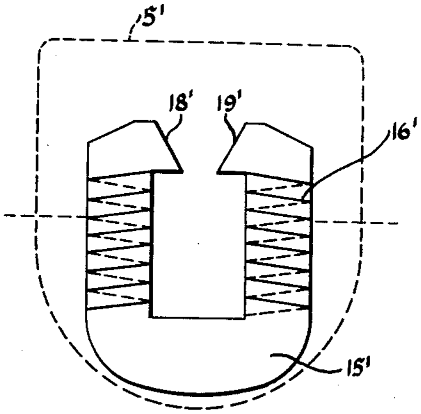
Fig. 5 is a partly schematic showing of a modified contactor unit.

Referring to Fig. 5 there is shown a modification of the electromagnetic contactor device of Fig. 4. The alternative form of core comprises a substantially U-shaped, laminated magnetic member 15′ having integrally formed therewith a pair of outwardly diverging pole faces 18′ and 19′ for cooperation with an armature similar to that shown in Fig. 4. The core is wound with a coil 16′ comprising a pair of series connected windings on the respective legs of the U-shaped member. The core and coil assembly is molded in a base 5′ shown by broken lines with connecting conductors extending through opposite sides of the base.

Referring to Figs. 10 and 11 there is shown a plurality of contactor units in interlocking arrangement. Pairs of contactor units 60*a*, 60*b* and 61*a*, 61*b* are forwardly arranged in abutting front-to-back, stacked relation so that the respective stacks are in bottom-to-bottom relation. The respective stacks of contactor units are rigidly secured to a suitable mounting member 62 by means of clamping bolts 63*a* and 63*b*. A mechanical interlocking member 64 comprising an elongated strip of non-magnetic material or the like having adjacent each end thereof a pair of laterally outwardly extending projections 65*a*, 65*b* and 66*a*, 66*b* with the projections of each pair being in axial alinement. Member 64 is slidably accommodated in the passage formed by opposed grooves 12 and 13 in the bases of respectively adjacent contactor units. Member 64 is further provided wtih a pair of elongated slots 67*a* and 67*b* threaded by clamping bolts 63*a* and 63*b*, respectively, to permit sliding movement of member 64 relative to the latter. Projections 65*a* and 65*b* at the left-hand end of member 64 extend through slot 48*a* and opening 48*b* in respectively adjacent contactor units of a stack of two such units into contiguous engagement with the aforementioned lateral portions of the shading coil. Similarly, the projections 66*a* and 66*b* at the right-hand end of member 64 engage the shading coils of the contactor units of the other stack of two such units to mechanically interlock all four armatures. Thus, energization of one or more of the contactor units in the left-hand stack as shown in Fig. 10 results in movement of interlocking member 64 to its extreme position in the right-hand direction wherein projections 66*a* and 66*b* block the armature of the right-hand stack to effectively prevent simultaneous operation thereof. Similarly, energization of one or more contactor units in the right-hand stack results in movement of member 64 in the left-hand direction to maintain the armatures in the left-hand stack in their normally open position. This interlocking arrangement is especially suitable for motor reversing applications and the like wherein forward and reverse contactors must be interlocked not only electrically but also mechanically to avoid any possibility of simultaneous operation thereof.

An energizing circuit for a plurality of the aforementioned contactors is shown in Fig. 8. Conductors L1, L2 and L3 are connected through suitable switches (not shown) to a three-phase power supply source. Contactors 2, 3 and 4 having energizing coils 2*a*, 3*a* and 4*a* and normally open contacts 2*b*, 3*b* and 4*b* are connected to the power supply conductors to be energized across the three phases, respectively. Thus, energizing coil 2*a* for operating contacts 2*b* in conductor L1 is connected across conductors L1 and L2, coil 3*a* for operating contacts 3*b* in conductor L2 is connected across conductors L2 and L3 and coil 4*a* for operating contacts 4*b* in conductor L3 is connected across conductors L3 and L1. Each of the energizing coils is shown connected to the conductors on the power supply source side of its respectively associated contact while the other ends of the conductors are connected to a load. Let it be assumed that the aforementioned switches are closed to connect conductors L1, L2 and L3 to a three-phase power supply source. This results in energization of coil 2*a* in the first phase, coil 3*a* in the second phase and coil 4*a* in the third phase to close contacts 2*a*, 3*a* and 4*a* in a predetermined time relation in accordance with the frequency of the power supply source.

An essential feature of the invention resides in dividing the usual power contactor into three units as shown in Fig. 8 responsive to the respective phases of the power supply source so that each contact closes in single phase at zero voltage and opens at zero current. It will be apparent that employment of three such contactor units results in reduction of the shock caused by armature closure and an even distribution of such reduced shock in time and space. As commutation occurs at a much lower energy level, the power contactor is inherently quieter and has a substantially longer mechanical and electrical operational life. In addition the invention affords a reduction in the total amount of copper required in the coils. While optimum results are attained when the respective contacts close in single phase at zero voltage and open at zero current, it will be apparent that departures from this ideal condition of as much as forty-five degrees plus or minus provides average electrical commutation at one-half the average energy heretofore required. On the other hand, if such departures are restricted to plus or minus thirty degrees, the commutation energy level is reduced to one-fourth of the amount commutated by a single coil operating a three-phase contactor. At these low levels of power, the arcs are almost completely confined resulting in significant reduction in electrical noise. Such division of commutation provides not only a reduction in manufacturing costs but also a decrease in weight, an increase in heat dissipating surface area and a more efficient use of the space occupied by the contactor. The contactor unit heretofore described also lends itself for use in pairs for higher power applications. It will be apparent that the delay in operation between the several contactor units can be attained mechanically and magnetically as well as in the manner hereinbefore described.

As indicated by broken line BL in Fig. 8, the operating coils can alternatively be connected on the load side of selected contacts as well as on the power supply side thereof to provide for operation of the contacts in any desired permutation or combination. Connection of coil 4*a*, for example, to conductor L1 on the load side of contact 2*b* as shown by broken line BL rather than on the power supply side as shown by solid line SL would result in delaying the energization of coil 4*a* until contact 2*b* closes. Similarly, operating coils 2*a* or 3*a* may alternatively be connected on the load side of selected contacts to afford a desired sequence of operation. In each case, one of the coils must be connected to the power supply side of the contacts to initiate operation of the device.

Referring to Fig. 8*a*, there is shown an alternative circuit arrangement for commutation of power from a three-phase power supply source to a load. Conductors L1, L2 and L3 are connected through suitable on-off switches (not shown) to a three-phase power supply source. In this arrangement an additional contactor is employed in conjunction with suitable "start" and "stop" switches preferably of the low pressure mercury type to provide an electrical interlock effective upon a momentary closure of the "start" switch. Contactors 71 and 72 having energizing coils 71*a* and 72*a* and normally open contacts 71*b* and 72*b* in series connection are provided for connecting conductor L1 to a load. A contactor 73 having an energizing coil 73*a* and normally open contacts 73*b* is provided for connecting conductor L2 to the load, while a contactor 74 having an energizing coil 74*a* and normally open contacts 74*b* is provided for connecting conductor L3 to the load. Coils 71*a* and 72*a* are connected in series with a normally open "start" switch across conductors L1 and L2, while coils 73*a* and 74*a* are connected in series with a normally closed "stop" switch and the aforementioned "start" switch across conductors L1 and L3. A holding circuit is provided from the junction of contacts 71*b* and 72*b* through conductor 75 to the junction of the "stop" switch and coil 73*a* for shunting the "start" switch as hereinafter described.

Let it be assumed that the aforementioned on-off switch is closed to connect a three-phase power supply source to conductors L1, L2 and L3. When the "start" switch is momentarily closed, an energizing circuit is established from conductor L1, "start" switch, coils 71*a* and 72*a* to conductor L2. Closure of the "start" switch also establishes an energizing circuit from conductor L1, "start" switch, "stop" switch, coils 73*a* and 74*a* to conductor L3. Assuming that the phases of the power supply source are such that contactors 71 and 72 operate first in the phase of conductors L1—L2, energization of coils 71*a* and 71*b* results in closure of contacts 71*b* and 72*b*, respectively, to connect conductor L1 to the load. Upon the closure of contacts 71*b*, a holding circuit is established for coils 71*a* and 72*a* through conductor 75 shunting the "start" switch so that the latter may be released. Closure of contacts 71*b* also results in establishment of a parallel circuit through conductor 75 for coils 73*a* and 74*a*. The latter coils energize in the phase of conductors L1—L3 to close contacts 73*b* and 74*b* thereby to connect conductors L2 and L3 to the load. Thus, a sequence of operation is attained wherein the closure of contacts 71*b* and 72*b* is spaced in time from the closure of contacts 73*b* and 74*b*.

When the "stop" switch is pressed, the aforementioned holding circuit is interrupted to deenergize coils 71*a* and 72*a* to release contacts 71*b* and 72*b*. Opening of contact 71*b* interrupts the aforementioned parallel circuit to coils 73*a* and 74*a* to deenergize the latter and disconnect the power supply source from the load.

I claim:

1. In an electromagnetic device, a unitary molded base comprising an armature cavity centrally disposed in the upper portion thereof and a pair of contact cavities on opposite sides of and opening into said armature cavity, a unitary magnetic core and operating coil means embedded in said base, portions of said core forming pole faces being exposed in said central cavity, an armature guided for reciprocal motion within said central cavity by wall portions of the latter, spring means for normally biasing said armature away from said core, stationary contacts in said pair of cavities, and movable contact means removably secured to said armature for retaining the latter in said central cavity and for cooperation with said stationary contacts.

2. The combination according to claim 1, wherein said pole faces of said core have an outwardly diverging configuration and said armature comprises a substantially T-shaped magnetic member comprising a cross portion and a depending leg portion having converging sides for cooperation with said pole faces of said core, a shading coil rigidly secured around said magnetic member and having depending portions extending beyond the latter, and a spring between said depending portions for normally biasing said armature away from said core.

3. The combination according to claim 2, together with an opening between the cross portion of said T-shaped magnetic member and said shading coil for accommodating said movable contact member, said movable contact member and said shading coil having engaging portions for locking said movable contact member in said opening, and slots extending through the side walls of said base into said contact cavities to facilitate insertion of said movable contact member in said opening.

4. In an electromagnetic device for plural-phase operation, a plurality of substantially flat contactor units adapted for stacking in relatively forward and reverse interfitting relation, each of said contactor units comprising a molded base having a unitary core and operating coil means embedded therein with at least a portion of said core being exposed to form pole faces, an armature disposed for cooperation with said pole faces, and spring means having at least a portion thereof positioned intermediate the latter and normally biasing said armature therefrom.

5. The combination according to claim 4, together with at least one stationary contact rigidly secured to the base of each of said contactor units, and a movable contact removably secured to said armature for cooperation with said stationary contact.

6. The combination according to claim 4, together with a plurality of stationary contact means mounted in the base of each of said contactor units, and movable contact means comprising a plurality of contact tip portions removably attached to said armature for cooperation with said plurality of stationary contact means.

7. The combination according to claim 6, together with a plural-phase alternating current supply source, means comprising said contact means of said plurality of contactor units for connecting respective phases of said supply source to a load, and means for connecting the coils of said contactor units for operation by a plurality of phases of said supply source in a predetermined permutation.

8. In an electromagnetic contactor device for plural-phase operation, a plurality of substantially flat, stacked contactor units having spaced, complementary engaging portions for frictional engagement therebetween in selective forward and reverse abutting relation, each of said contactor units comprising a unitary molded base having a central cavity in the upper portion thereof for receiving an armature and at least one contact cavity adjacent to and opening into said central cavity, a unitary core and coil means embedded in said base, portions of said core forming pole faces extending into said central cavity, an armature reciprocable in said central cavity for cooperation with said pole faces, a stationary contact in said contact cavity, and a movable contact cooperable with said stationary contact removably secured to said armature and extending therefrom, into interfering engagement with a wall of said contact cavity to limit reciprocatory movements of said armature.

9. In an electrical control system for connecting a plural-phase alternating current supply source to a load, a plural-pole contactor device comprising a plurality of stacked contactor units having complementary engaging portions, each contactor unit having contacts connected between one phase of the supply source and the load and an energizing coil, and means for connecting the coils of said contactor units for energization by a plurality of the phases of the supply source in a desired order, at least one of said coils being connectable to the supply source independently of said contacts.

10. The combination according to claim 9, wherein the coil of at least one of said contactor units is connectable to the supply source through contacts of another of said contactor units to distribute the operating shocks of said contactor device in time and space.

11. The combination according to claim 9, wherein said coils of said contactor units are connected to either side of said contacts in the plurality of phases of said supply source to provide a desired permutation and combination of operation of said contacts.

12. The combination according to claim 9, wherein the coil of each contactor unit is connected to be energized by a different phase of the supply source to provide sequential operation of said contacts such that each contact will connect a single phase of the supply source to the load when its corresponding voltage is approximately zero and disconnect such single phase when its corresponding current is approximately zero.

13. In an interlocking mechanism for electro-magnetic devices, in combination, a plurality of stacks of generally flat electromagnetic units, each unit comprising a molded base having an electromagnet embedded therein and a spring-biased armature for cooperation with and normally biased away from said electromagnet, elongated grooves on opposite surfaces of said base, the grooves on abutting units being in registration to provide a longitudinal passage therebetween, an interlocking member slidably received in and extending through the passages between abutting units in said plurality of stacks, said member having laterally, oppositely extending projections at spaced portions for engagement with the armatures of pairs of stacked units to prevent simultaneous operation of the latter.

14. In a contactor interlocking means, in combination, a stationary mounting member, a plurality of stacks of generally flat contact units mounted on said member, each contactor unit comprising a molded base, a unitary core and operating coil means embedded in said base, a central cavity in the upper portion of said base, portions of said core forming pole faces extending into said central cavity, a spring-biased armature disposed in said central cavity for cooperation with and normally biased away from said pole faces, elongated grooves on opposite surfaces of said base providing a longitudinal passage between abutting contactor units, an interlocking member slidably received in said passage between pairs of contactor units in adjacent stacks, said interlocking member having lateral projections on opposite ends thereof in engagement with the armatures of said pairs of contactor units to prevent simultaneous operation of the latter.

15. The combination according to claim 14, together with contact cavities on opposite sides of and opening into said central cavity, stationary contacts in said contact cavities, and a movable contact removably secured to said armature for cooperation with said stationary contacts and for retaining said armature in said central cavity.

16. In an electromagnetic contactor device for alternating current operation, in combination, a plurality of substantially flat, stacked contactor units having spaced, complementary engaging portions for frictional engagement therebetween in abutting relation, each of said contactor units comprising a unitary molded base having an central cavity in a side portion thereof for receiving an armature and a contact cavity adjacent to and opening into said central cavity, a unitary core and coil embedded in said base, portions of said core forming pole faces extending into said central cavity, an armature in said central cavity for cooperation with said pole faces, a stationary contact in said contact cavity, and a movable contact secured to said armature and extending into said contact cavity for cooperation with said stationary contact, means for connecting the coils of said contactor units to an A.C. supply source for energization by the latter, and means comprising the contacts of said contactor units for establishing a predetermined connection from said supply source when said coils are energized.

References Cited in the file of this patent

UNITED STATES PATENTS

| | | |
|---|---|---|
| 649,105 | Loomis | May 8, 1900 |
| 819,268 | Doman | May 1, 1906 |
| 649,105 | Loomis | May 8, 1908 |
| 2,448,650 | Aitken | Sept. 7, 1948 |
| 2,449,221 | Hammerly | Sept. 14, 1948 |
| 2,514,913 | Tyrner | July 11, 1950 |
| 2,527,280 | Smith | Oct. 24, 1950 |
| 2,558,609 | Davis | June 26, 1951 |
| 2,616,010 | Scheib | Oct. 28, 1952 |
| 2,692,926 | Cole | Oct. 26, 1954 |
| 2,732,451 | Degler | Jan. 24, 1956 |
| 2,824,191 | Christensen | Feb. 18, 1958 |
| 2,871,422 | Jessee | Jan. 27, 1959 |